(12) United States Patent
Dipperstein

(10) Patent No.: US 6,185,191 B1
(45) Date of Patent: Feb. 6, 2001

(54) TESTING OF ISDN LINE VIA AUXILIARY CHANNEL SIGNALING

(75) Inventor: Michael David Dipperstein, Ventura, CA (US)

(73) Assignee: Harris Corporation, Melbourne, FL (US)

( * ) Notice: Under 35 U.S.C. 154(b), the term of this patent shall be extended for 0 days.

(21) Appl. No.: 08/984,287

(22) Filed: Dec. 3, 1997

(51) Int. Cl.[7] ....................................... H04J 3/14
(52) U.S. Cl. ...................... 370/249; 370/524; 379/21
(58) Field of Search ................................ 370/241, 249, 370/250, 251, 252, 522, 524; 379/5, 21, 23

(56) References Cited

U.S. PATENT DOCUMENTS

| | | | |
|---|---|---|---|
| 4,105,995 | * | 8/1978 | Bothof et al. .................. 714/714 |
| 5,010,544 | * | 4/1991 | Chang et al. ................... 370/243 |
| 5,027,343 | * | 6/1991 | Chan et al. ..................... 370/250 |
| 5,157,665 | * | 10/1992 | Fakhraie-Fard et al. ............. 714/712 |
| 5,166,925 | * | 11/1992 | Ward .................................... 370/250 |
| 5,390,179 | * | 2/1995 | Killian et al. ........................ 370/249 |
| 5,784,558 | * | 7/1998 | Emerson et al. . | 
| 5,982,851 | * | 11/1999 | Kennedy et al. ....................... 379/21 |

* cited by examiner

Primary Examiner—Min Jung
(74) Attorney, Agent, or Firm—Allen, Dyer, Doppelt, Milbrath & Gilchrist, P.A.

(57) ABSTRACT

A portable ISDN test set is configured to be interfaced with any location of an ISDN link, and is operative to test the link, irrespective of the hardware configuration of the circuit, (e.g., two-wire vs. four-wire). The ISDN test set contains a digital communications controller and associated digital signalling interface circuits, including both 'U' interface and 'S/T' interfaces. The ISDN test set and a remote device, such as another test set, exchange digital communication messages over an auxiliary ISDN channel, such as an embedded operations channel or a Q channel, that are effective to cause the device to provide a loopback path over at least one ISDN bearer channel to the test set and test a prescribed operational characteristic of the link.

18 Claims, 6 Drawing Sheets

TESTING OF ISDN LINE VIA AUXILIARY CHANNEL SIGNALING

CROSS-REFERENCE TO RELATED APPLICATIONS

The present application is a continuation-in-part of co-pending U.S. patent application Ser. No. 08/855,117, filed May 13, 1997, entitled: "Test Set Using ISDN Bearer Channel for Testing Telephone Line," by R. Soto et al (hereinafter referred to as the '117 application now abandoned), assigned to the assignee of the present application, and the disclosure of which is herein incorporated.

The invention disclosed in the present invention also relates to subject matter disclosed in the following co-pending U.S. patent applications, each of which is filed coincident with the filing of the present application, is assigned to the assignee of the present application, and the disclosures of which are incorporated herein: Ser. No. 08/984,515, entitled "Automated Master-Slave Connectivity for Dry Loop ISDN Line," by R. Soto et al, (hereinafter referred to as the '515 application); Ser. No. 08/984,230, entitled "Call Yourself BERT Testing of ISDN Line," by M. Kennedy et al, (hereinafter referred to as the '230 application) (now U.S. Pat. No. 5,982,851); Ser. No. 08/984,284, entitled "User Selectable Overlap and Enbloc Speed Dialing of ISDN Line," by Paul Katz et al, (hereinafter referred to as the '284 application); and Ser. No. 08/984,233, entitled "Interactive Contextual-Based Assistance for Portable ISDN Test Set," by P. Katz et al, (hereinafter referred to as the '233 application).

FIELD OF THE INVENTION

The present invention relates to telecommunication systems, and is particularly directed to a communication and testing control mechanism, that is incorporated within a craftsperson's test set having an architecture of the type described in the above-referenced '117 application, for facilitating the testing of an ISDN communication circuit.

BACKGROUND OF THE INVENTION

As described in the above-referenced '117 application, a variety of telecommunication test units have been proposed for testing digital signalling circuits. Such digital signaling circuits may include, but are not limited to, those transporting high bit-rate digital subscriber line (HDSL) signals, asymmetrical digital subscriber line (ADSL) signals, digital data service (DDS) signals and integrated services digital network (ISDN) signals. Unfortunately, such conventional test units are relatively cumbersome and hardware-intensive devices, that are customarily resident in a telcom service office or other fixed system installation, affording only a single point of access to the circuit to be tested.

A non-limiting example of such a conventional test unit is described in the U.S. Pat. No. 5,208,846, to Hammond et al, entitled: "Subscriber Loop Tester for Telephone Switching Systems." In order to be connectable with different types of telecommunication circuits, the Hammond et al test unit contains different types of line interfaces/jacks. Determining which jack is to be used requires that the test system operator have a priori knowledge of the communication link to which the test set is to be coupled. Without this knowledge, the user does not know to which jack the line should be connected, and cannot readily configure the test unit to support a particular user interface and associated termination hardware.

As noted above, because conventional test units are relatively large and fixed pieces of equipment, they are not readily suited for use in the field (i.e., they are not portable). As a consequence, they are not readily interfaced with any accessible location of a communication link. This relatively poor facility of transport and ready connection to any location along a link to be tested also limits the practicality and effectiveness of such test units.

These shortcomings have become a particular concern to telecommunication service providers, especially with the continuing expansion and demand for integrated services digital network (ISDN) services. Not only is there currently a need for a practical, portable test set that is capable of testing already installed ISDN circuits, but one which can perform 'dry loop' line testing, prior to its use for ISDN service; namely, there is a need for an ISDN test device that will permit a circuit to be 'prequalified' (as ISDN-capable), before ISDN equipment is purchased and connected to the line to be used for ISDN service.

Advantageously, the portable test set described in the above-referenced '117 application employs a communication architecture that is readily interfaced with virtually any location of a link/circuit to be tested, so as to allow testing of the link, irrespective of its configuration (e.g., two-wire vs. four-wire), or the type of signals that may be conveyed over the link (analog or digital). In addition to circuitry for testing the operation of a standard analog (POTS) line, the portable test set described in the '117 application contains a digital communications controller and associated digital signalling interface components, including both 'U' interface and 'S/T' interface circuits.

Thus, the test set can be interfaced with either a two-wire network link or a four-wire customer premises link, and may transmit and receive ISDN bearer channel messages over either type of circuit. The contents of the bearer channel messages may be defined to evoke prescribed responses from a companion test set coupled to another portion (relatively far end) of the communication circuit of interest, so that the circuit linking the two test sets may be tested. When two test sets are coupled to spaced apart locations of the circuit/line under test, they may operate in respective master and slave modes, allowing a craftsperson using the master test set to initiate a bit error rate test (BERT) from one end of the circuit, and derive a measure of the operational performance characteristic of the in-between segment of the circuit.

SUMMARY OF THE INVENTION

The present invention is directed to an enhancement of the ISDN communication and testing capability of the test set described in the '117 application, that not is only capable of performing line prequalification and post installation testing, but does so in a manner that simplifies the interaction between the user/craftsperson and the test set, thereby minimizing line testing inaccuracies (which often depend upon the skill and familiarity of the technician with ISDN communications) and improving performance.

Pursuant to a first aspect of the present invention, dry loop prequalification testing of a (two-wire) ISDN U-interface is conducted by coupling a test set as a line termination (LT) unit to a central office end of the line, and using the embedded operations channel (eoc) to conduct a prescribed message exchange sequence with a network termination (NT) unit (such as another test set, or a NT-1 device) at the customer premises. In this dry loop mode of eoc testing of the two-wire ISDN line from the central office, there is no connection between the U-interface and the central office switch (and therefore no powering of the two-wire line by the central office). All signalling is effected from the test set's two-wire 'U' interface chip. Where another test set of the type described in the '117 application is coupled to the ISDN line at the customer premises, the line is also disconnected from any terminal equipment at that point. A typical, but non-limiting, case would involve the use of one or a pair of test sets to ISDN-prequalify one or more lines of a bundle of two-wire pairs within already installed communication cable.

In accordance with the eoc-based message exchange sequence, a user or craftsperson operating a sourcing test set (as an LT device at the central office) activates a MENU key on the test set keypad, which causes the test set's LCD display panel to display a list of options available to the user, one of which is a bit error test (BERT). The BERT option is selected via a numeric key on the keypad associated with the listing in the displayed menu option. In response to this key command selecting the BERT option, the control software executed by the test set's supervisory microcontroller causes the display unit to display a list of prescribed parameter options (including the data rate to be employed (e.g., 56 Kbaud or 64 Kbaud), the length of time the test is to be run, and which bearer channel (B1, B2 or both B1 and B2) is to be looped back for conducting the BERT). Via the keypad, parameter values for the listed menu are entered.

Once the list of parameter options has been entered, the user simply operates a soft START key displayed on the test unit's display screen, which automatically causes a master-slave message exchange sequence to take place, beginning with the transmission of a first message (CLEAR ALL LOOPBACKS) over the embedded operations channel (eoc) to the far end device. In response to this message, the far end (slave) device clears all loopbacks (on each of the B1, B2 channels), and transmits a return message (LOOPBACKS CLEARED) to inform the master site that all loopbacks have been cleared.

In response to receiving the LOOPBACKS CLEARED return message, the master test set transmits an ACTIVATE LOOPBACK message to the far end device. The ACTIVATE LOOPBACK message identifies which bearer channel(s) is to be looped back (as previously menu-selected by the user). In response to the ACTIVATE LOOPBACK message, the slave device loops back the channel or channels specified in the eoc message and returns a message (LOOPBACKS ACTIVATED), informing the supervisory test set that the loopback is complete. Upon receipt of this LOOPBACK ACTIVATED message, the master test set initiates a BERT (by causing the transmission of a pseudo random bit stream over the looped back bearer channel(s)).

The data returned over a looped back bearer channel is compared with the contents of the transmitted pattern to derive a bit error ratio (BER) and the number of errors and the number of errored seconds, which are then displayed via the master test set's display screen. The BERT continues until either the user manually intervenes by selecting a stop key on the test set display, or a time-out expires. To confirm that the BERT is operating correctly, the craftsperson at the master test set may use an INSERT ERROR option of the displayed menu, to selectively cause the insertion of error bits in the BERT bit pattern transmitted over the loop. If this option is exercised, the displayed BERT data should reflect the deliberately injected errors.

In accordance with a second aspect of the invention, the ISDN test set may be used to test a four-wire S/T interface installed between the network termination (NT-1) and one or more terminal equipment devices at the customer premises, by coupling the test set to a terminal device end of the four-wire S/T circuit and conducting a similar Q channel message exchange scenario that uses a channel other than or exclusive of the eoc channel, namely, the Q channel. In this mode, the S/T interface is used to gain access to the Q channel in order to exchange command-response messages (such as a Q channel loopback command) with the network termination (NT-1) unit, and to provide an indication of whether the NT-1 has effected a loopback over the S/T interface, in compliance with the Q channel loopback command message.

As in the case of the eoc-based message exchange described above, a craftsperson operating a test set connected as a TE device activates the MENU key on the test set keypad, causing the test set's LCD display panel to display a list of options available to the user, one of which is BERT. In response to a key command selecting the BERT option, the S/T interface loopback test routine causes the display unit to display a list of parameter options, such as the data rate to be employed, the length of time the test is to be run, and which bearer channel (B1, B2 or both B1 and B2, as described above. Via the keys of the test set keyboard, the user selects and provides parameter values for the listed menu options.

Once the list of parameter options has been entered, the craftsperson invokes the START key, which causes the transmission of a CLEAR ALL LOOPBACKS message over the Q channel to the NT-1 device. If the NT-1 device is operating properly it will transmit a return message (LOOPBACKS CLEARED), indicating that all loopbacks have been cleared. Next, an ACTIVATE LOOPBACK message, identifying which bearer channels are to be looped back (as previously menu-selected by the user). In response to the ACTIVATE LOOPBACK message, the NT-1 device loops back the channel or channels specified in the Q channel message and returns a message (LOOPBACKS ACTIVATED), informing the TE device-emulating test set that the loopback is complete.

In response to receipt of this loopback activated message, the S/T interface test routine initiates a BERT, as described above for the eoc. Again, the measured bit error ratio (BER), the number of errors and the number of errored seconds are displayed. The BERT continues until either the user manually by selecting a stop key on the test set display, or a time-out expires. Also, as in the case of eoc testing of the two-wire interface, in order to confirm proper operation of the BERT on the Q channel portion of the looped back four-wire S/T interface, the craftsperson may access an INSERT ERROR option of the test set's displayed menu, to selectively cause the insertion of error bits in the transmitted BERT bit pattern.

DETAILED DESCRIPTION

Figure 1:
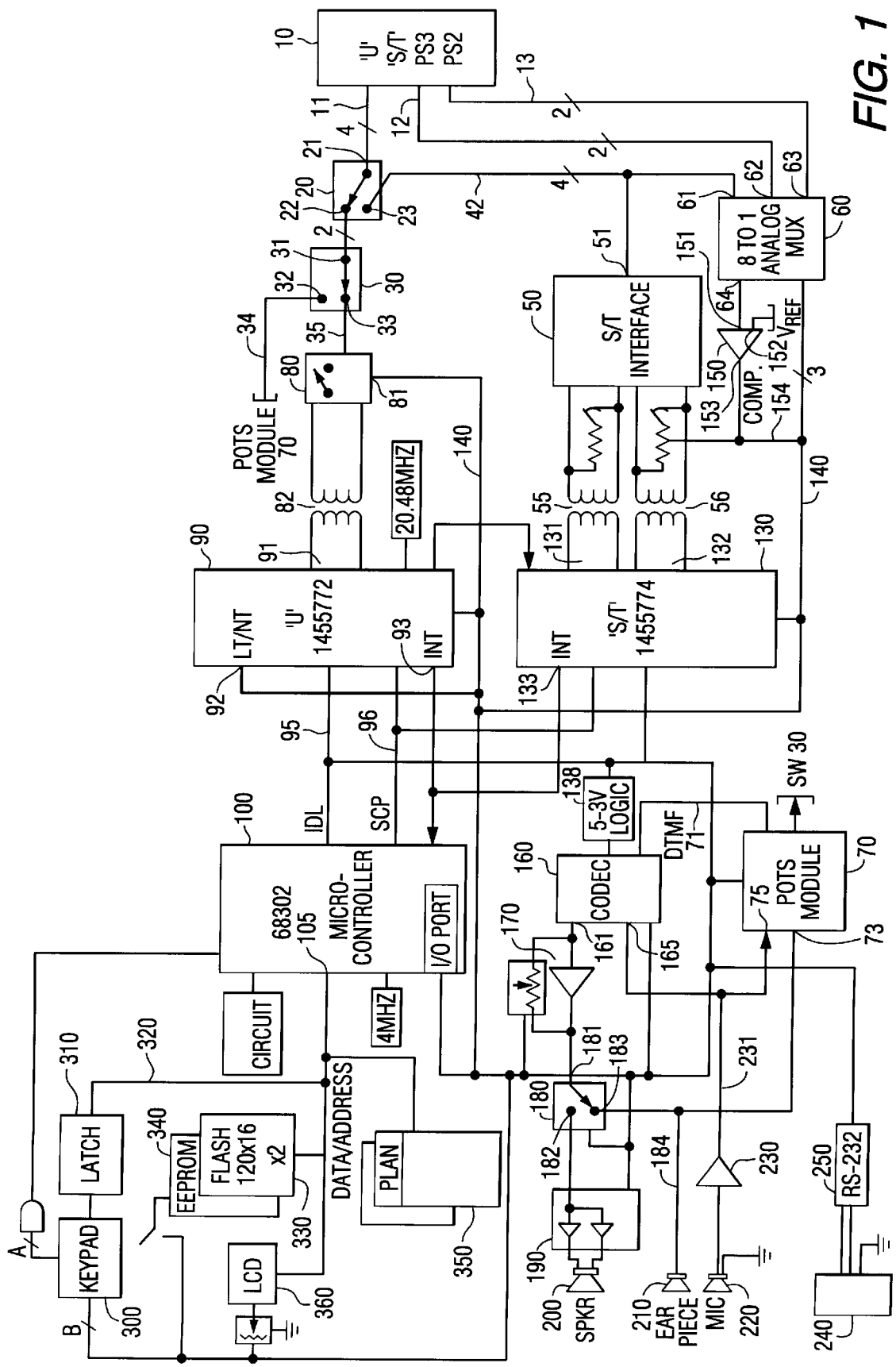
FIG. 1 diagrammatically illustrates the architecture of the ISDN test set described in the '117 application.

Before describing in detail the new and improved ISDN auxiliary channel testing mechanism of the present invention, it should be observed that the invention resides primarily in what is effectively an augmentation of the operational control software executed by the supervisory control processor of the test set of the '117 application. The circuitry of the test set is otherwise essentially unaffected. Consequently, the architecture of the test set per se, and the manner in which it is interfaced with communication equipment of a telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Figure 2:
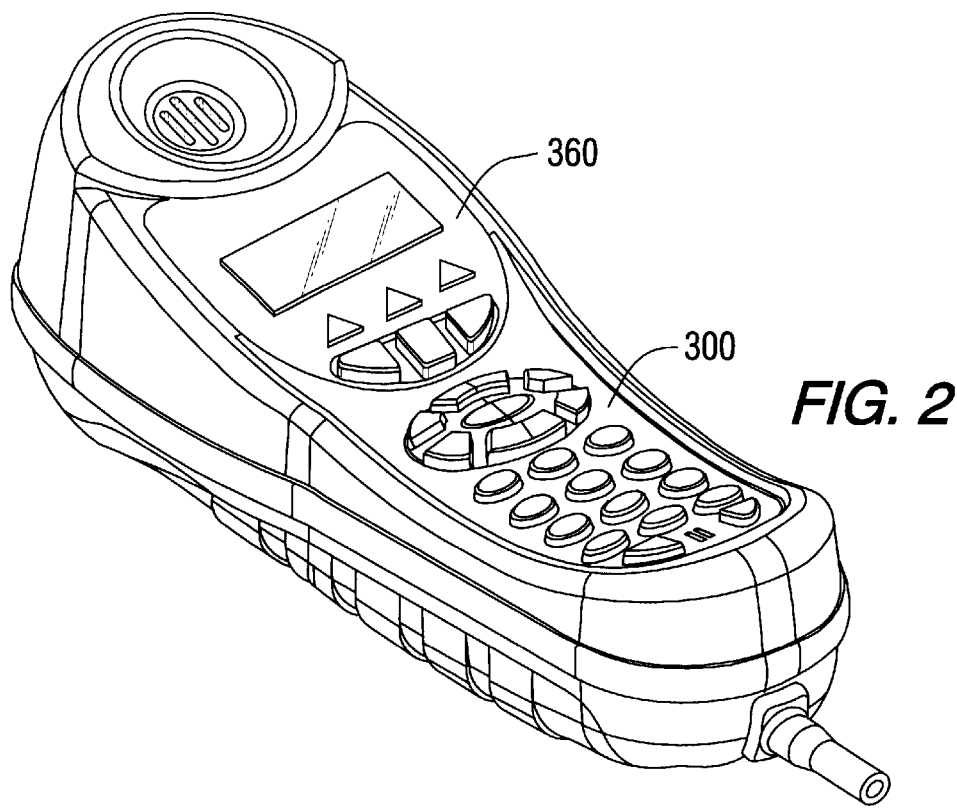
FIGS. 2 and 3 are respective front and rear isometric pictorial views of a housing configuration for the ISDN test set of FIG. 1.
Figure 3:
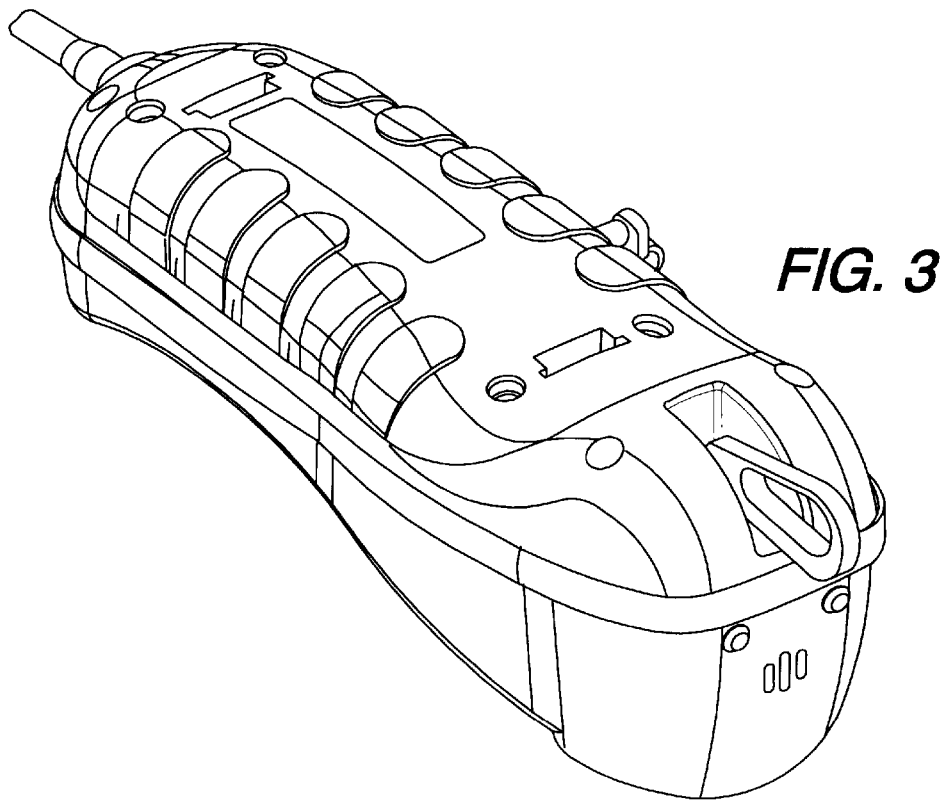

The overall communication and signal processing circuit architecture of a test set of the type described in the '117 application, in which the communication and testing control mechanism of the present invention may be readily incorporated, is diagrammatically illustrated in FIG. 1. To facilitate portability and ruggedized field use, the test set's circuit architecture is preferably housed within a robust protective casing physically configured as diagrammatically illustrated in the isometric pictorial views of FIGS. 2 and 3, and disclosed in detail in the following co-pending U.S. patent applications: Design Ser. No. 29/061,617, entitled: "ISDN Test Set," by R. Soto et al, filed Oct. 28, 1996, which is a continuation-in-part of U.S. Design Ser. No. 29/053,246, entitled: "ISDN Test Set," by R. Soto et al, filed Apr. 18, 1996; and Utility Applications: Ser. No. 08/754,077, filed Nov. 20, 1996, entitled "Telephone Test Set Keypad with Integrated Dynamic Microphone," by E. Zoiss et al; Ser. No. 08/753,101, filed Nov. 20, 1996, entitled "Telephone Test Set LCD Panel Carrier," by E. Zoiss et al (now U.S. Pat. No. 5,768,369); Ser. No. 08/754,075, filed Nov. 20, 1996, entitled "Line Cord Strain Relief Attachment for Telephone Test Set," by E. Zoiss et al; (now U.S. Pat. No. 5,755,590) and Ser. No. 08/754,076, filed Nov. 20, 1996, entitled "Variable Geometry Battery Compartment for Accommodating Different Sized Batteries in Telephone Craftsperson's Test Set," by E. Zoiss et al (now U.S. Pat. No. 5,872,831). Each of the above applications is assigned to the assignee of the present application, and their disclosures are herein incorporated.

Referring now to FIG. 1, the communication and signal processing circuit architecture of the test set described in the '117 application is diagrammatically illustrated as comprising a multi-pin modular jack 10, engagable by a multi-pin conductor plug terminating one end of a multi-conductor line cord, through which the test set is connectable with a circuit under test. The respective pins of the modular jack 10 are connected via multi-conductor links 11, 12 and 13, to the internal circuitry of the test set.

For this purpose, a first four-pin link 11, two leads of which are respectively associated with tip and ring lead conductors of multi-pin jack 10, is coupled to a four-pin common port 21 of a first switch 20. A first, two-pin switch port 22 of switch 20 is coupled to a two-pin common port 31 of a second switch 30. A second, four-pin switch port 23 of first switch 20 is coupled to a four conductor link 42 to a four-pin port 51 of a transformer interface 50 and to a four pin input port 61 of an 8:1 analog multiplexer 60. Two-pin links 12 and 13 are coupled from modular jack 10 to respective two pin in ports 62 and 63 of 8:1 analog multiplexer 60.

The 8:1 analog multiplexer 60 has an output port 64 coupled to a first input 151 of a voltage threshold comparator 150. Voltage threshold comparator has a second input 162 coupled to receive a prescribed reference voltage $V_{REF}$. The output 153 of comparator is coupled to an input/output (I/O)-control bus 140 associated with the test set's supervisory processor (microcontroller) 100. The multiplexer 60 has a multibit steering control input 65 coupled to control bus 140, for selecting which of the respective portions of multiconductor links 42, 13 and 14 is coupled to comparator 150. Should the line voltage of the selected lead exceed the threshold reference voltage $V_{REF}$, the voltage comparator 150 provides an output on a voltage detect line portion 154 of the I/O control bus 140, which is read by the microcontroller 100. The states of the respective sets of leads 11–13 are mapped by an internal truth table used by the microcontroller 100 to identify the type of line to which the test set is connected.

A first, two pin port 32 of the switch 30 is coupled via link 34 to a POTS line interface module 70. Module 70 module contains conventional dial tone detector and DTMF signalling circuitry, and is employed for conducting voice communications, DTMF and dial pulse signalling on a POTS line. A second two pin switch port 33 of switch 30 is coupled via link 35 to a controlled attenuator 80. Attenuator 80 has a control port 81 coupled to the control bus 140, and is transformer-coupled, by way of transformer circuit 82, to a two wire port 91 of standard (two wire) 'U' interface chip 90, used for standard 2B1Q signalling.

The 'U' interface chip 90, which is coupled to and controlled by microcontroller 100, is selectively controlled via a control port 92 to function as either a line termination (LT) or a network termination (NT). As will be described, when either bit error rate testing (BERT) of the line, or dry-loop communications are to be carried out over the line under test, the 'U' interface chip 90 is selectively placed in LT mode. A port 93 provides an interrupt link to the microcontroller 100. Digital data communications between the two-wire 'U' interface chip 90 and the microcontroller 100 are effected by way of a first (IDL) digital serial bus digital 95 and a second (SCP) digital serial bus 96.

The four-wire transformer interface 50, to the four pin port 51 of which the four lead conductor link 42 is coupled from port 23 of switch 20, has respective pairs of two wire links 52 and 53 transformer-coupled, via transformer pairs 55 and 56, to respective two wire ports 131 and 132 of a (four wire) 'S/T' interface chip 130. Respective controlled attenuators 57 and 58 are coupled across links 52 and 53, and are controlled by way of control bus 140. Like the 'U' interface chip 90, the 'S/T' interface chip 130 is coupled to microcontroller 100 by way of the first digital link IDL 95 and the second digital link SCP 96. In addition, it has an interrupt port 133 for providing an interrupt signal to the microcontroller 100.

The first (IDL) digital serial bus 95 is further coupled through a (5V–3V) logic level translation circuit 138 to a CODEC 160. CODEC 160 is coupled via a DTMF link 71 to POTS line interface module 70. The CODEC 160 has a first output port 161 coupled through a controlled gain amplifier 170 to a common/input terminal 181 of a switch 180. Switch 180 has a first output terminal 182 coupled to a speaker amplifier 190, the output of which is coupled to an audio speaker 200. Switch 180 has a second output terminal 183 coupled to link 184 which is coupled to of POTS line interface module 70. Link 184 is further coupled to an earpiece receiver transducer 210 of the test set. A microphone (MIC) 220 is coupled to an amplifier 230, the output of which is coupled via link 231 to port 165 of CODEC 160 and to an audio input port 75 of POTS line interface module 70.

An auxiliary digital (RS 232) I/O port is provided by way of a multipin connector 240, such as an RJ-45 jack. This connector is coupled to an RS-232 transceiver 250, which may be used to monitor externally provided bearer (B) channel information or to download communication control software into the microcontroller 100. The RS-232 transceiver 250 is, in turn, ported to I/O-control bus 140.

User/craftsperson inputs for controlling operation of the test set are effected by means of a standard multi-key keypad 300, to which I/O-control bus 140 is coupled. Key depression of the keys of the keypad 300 generate input commands that are buffered in a latch 310, the contents of which are asserted onto a distributed multibit data/address bus 320. Data/address bus 320 is ported to a data/address port 105 of the microcontroller 100. Microcontroller 100 has a limited storage capacity flash memory 330, an EPROM 340 in which the operational software for the microcontroller is stored, and a random access memory 350 for storing data processed by the microcontroller's central processing unit (CPU).

The data/address bus 320 is also ported to an LCD unit 360, which provides an alpha-numeric visual display of a menu of options/actions that may be selectively invoked by keypad inputs from the user, and an indication of the operation of the test set, as microcontroller 100 sequences through stored test routines, to be described. In addition to the LCD unit 360, the test set may employ one or more discrete visual indicators, such as a set of LEDs that are coupled to I/O bus 140, and selectively individually energized by the microcontroller 100 to provide an indication of prescribed status or operational conditions of the line under test such as, but not limited to, ON/OFF hook, tip/ring polarity and test set battery charging status.

As described in the above-referenced '117 application, the test set architecture of FIG. 1 is able to conduct a number of analog and digital test operations of a line to it is connected. These test operations include an initial "LINE IDENTIFICATION" mode (in which the type of line to which the test set is connected is automatically determined), and "POTS" mode, (for testing a POTS line, in which the tip and ring line portions of the four-wire link 12 are coupled through switches 20 and 30 to the POTS line interface module 70).

Moreover, because the test set architecture of FIG. 1 includes both two-wire 'U' interface chip 90 and four-wire 'S/T' interface chip 130, the test set may be used to troubleshoot a potentially faulty digital (e.g., ISDN) circuit that is either upstream (toward the central office), or downstream (toward a remote terminal-customer premises equipment) of the location at which the craftsperson has connected a test set. Where two test sets of the type shown in FIG. 1 are available, the potentially faulty circuit of interest may be tested by placing respective test sets in a master-slave mode of operation. The 'master' test set may be connected to a first, test supervisory location of the line, from which the test is to be conducted (such as at a central office line termination location). The 'slave' test set may be connected to a second site of the line, geographically remote from the first site (such as at a network termination of a customer premises). Once a loopback path has been established between the two test sets, a BER test may be initiated from the master test set.

In addition to loopback (for bit error rate testing), an echo-back mode of operation may also be used. This mode is somewhat similar to the loopback mode, in that it's purpose is to have the slave test set send back to the master test set the contents of a prescribed data sequence. In echo-back mode, however, rather than the slave test set simply operating as a passive loopback device, the slave test set captures and then retransmits data placed on the D channel by the master test set.

Figure 4:
FIG. 4 diagrammatically illustrates a public switched telephone network (PSTN) at opposite ends of which respective master and slave ISDN test sets may be connected.
Figure 5:
FIG. 5 diagrammatically illustrates a dry loop ISDN circuit having opposite ends connected to respective master and slave ISDN test sets.

A voice link may be also established either over a public switched network, as diagrammatically illustrated in FIG. 4, or between two test sets that are connected to opposite ends of a non-powered or 'dry loop' link, as diagrammatically illustrated in FIG. 5, with one of the test sets operating in LT mode as a line termination device, and the other operating in NT mode as a network termination device. Also described in the '117 application is a callback mode of operation, which allows an unmanned slave test set to return a voice call (i.e., without the participation of an attendant craftsperson), and thereby determine whether a voice call can be established over the circuit under test.

As described above, the present invention is directed to an enhancement to the control software, executed by the test set's supervisory processor 100, for controlling the communication and testing functionality of the test set, including operations described in the '117 application, reviewed briefly above. As will be described, the present invention provides enhanced communication and operational control functionality, that uses embedded operations and Q channels, to facilitate testing and minimize errors in the course of testing an ISDN circuit. A major benefit of using such auxiliary ISDN signaling channels, per se, to establish BERT connectivity over ISDN bearer channels is the fact that a successful BERT provides an immediate indication of whether the line under test is ISDN-qualified.

LINE PREQUALIFICATION VIA DRY LOOP EOC CHANNEL SIGNALING

FIGS. 6–8

As described briefly above, the architecture of the test set of the '117 application not only permits testing of an already installed ISDN circuit, but also provides the ability to perform 'dry loop' testing of a line prior to its use for ISDN service. Such dry loop testing enables the telecommunication service provider to determine whether a particular line is qualified to transport ISDN service (e.g., complies with industry standard line length impedance parameters, is free from signal degrading impairments, such as bridge taps, etc.) before ISDN equipment is purchased and connected to that line.

Figure 6:
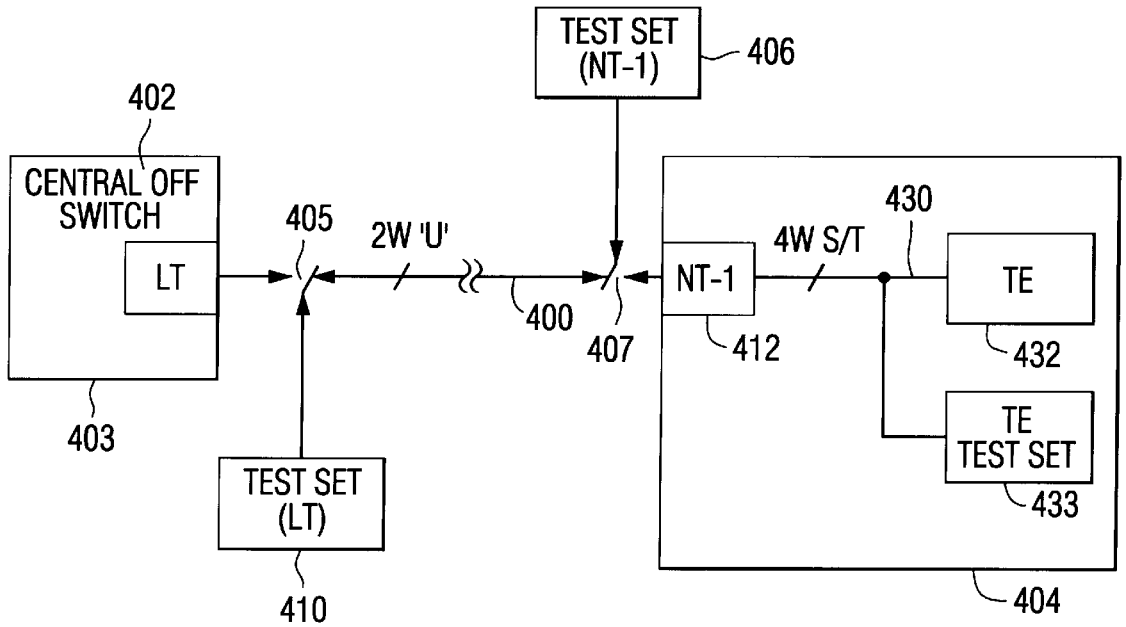
FIG. 6 diagrammatically illustrates a first aspect of the present invention, in which dry loop prequalification testing of a (two-wire) U-interface is conducted by coupling a test set as a line termination (LT) unit to a central office end of the line and using the embedded operations channel (eoc) to exchange messages with a network termination (NT) unit.

As diagrammatically illustrated in FIG. 6, pursuant to a first aspect of the present invention, dry loop prequalification testing of a (two-wire) line 400 is conducted by coupling a test set 410 as a line termination (LT) unit to a central office 402 end of the line and using the embedded operations channel (eoc) to exchange messages with a network termination (NT) unit 412 (such as another test set, or an NT-1 device) at the customer premises 404.

In this dry loop mode of testing of the two-wire U interface circuit or line 400 from the central office 402, there is no connection between the line 400 and the central office switch 403, as shown by line break 405, so that the line 400 is not powered from the central office equipment. Instead, all signalling is effected from the test set's two-wire 'U' interface chip 90 (FIG. 1), which is ported to the line 400. Where another test set of the type shown in FIG. 1 is coupled to the line 400 at the customer premises, as shown at 406, the line is also disconnected from any terminal equipment at that point, as shown at 407. A typical, but non-limiting, case would involve the use of one or more test sets to ISDN-prequalify one or more lines of a bundle of two-wire pairs within an already installed communication cable originally intended for conventional POTS signalling.

Figure 7:
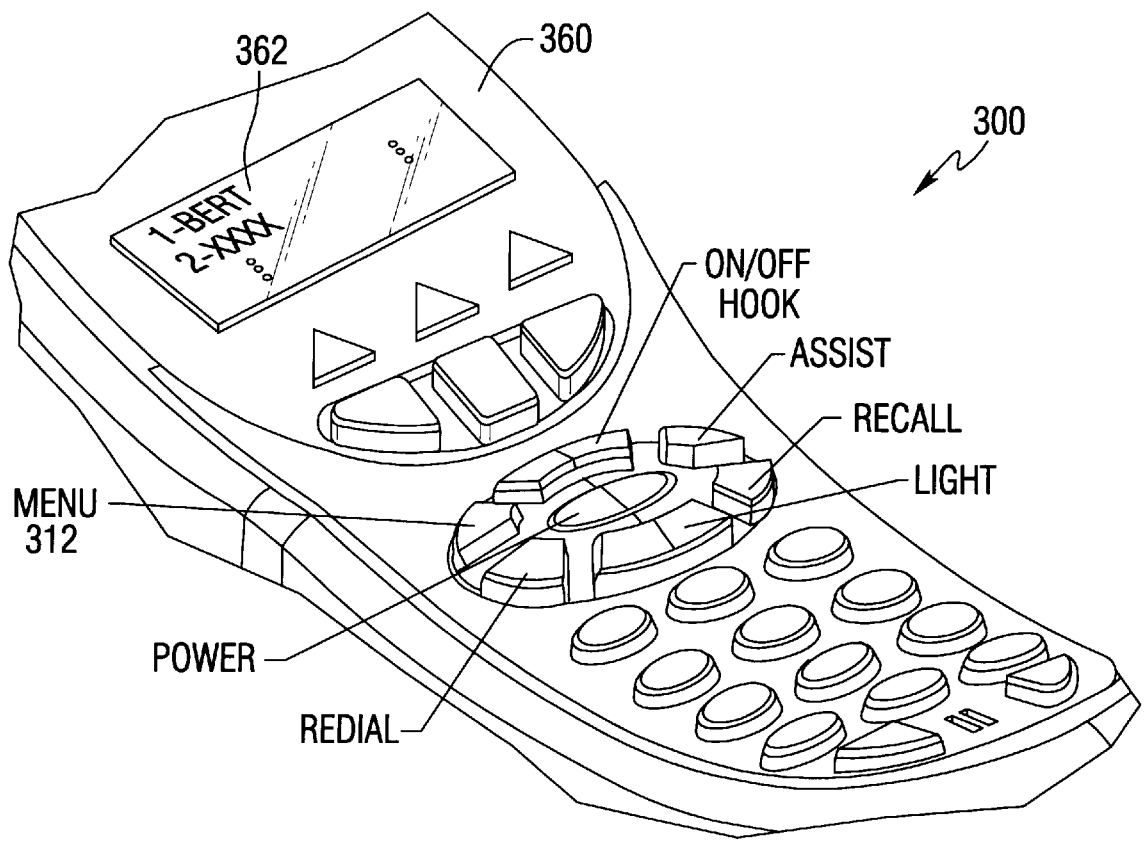
FIG. 7 pictorially illustrates a keypad portion of the test set of FIGS. 1–3.
Figure 8:
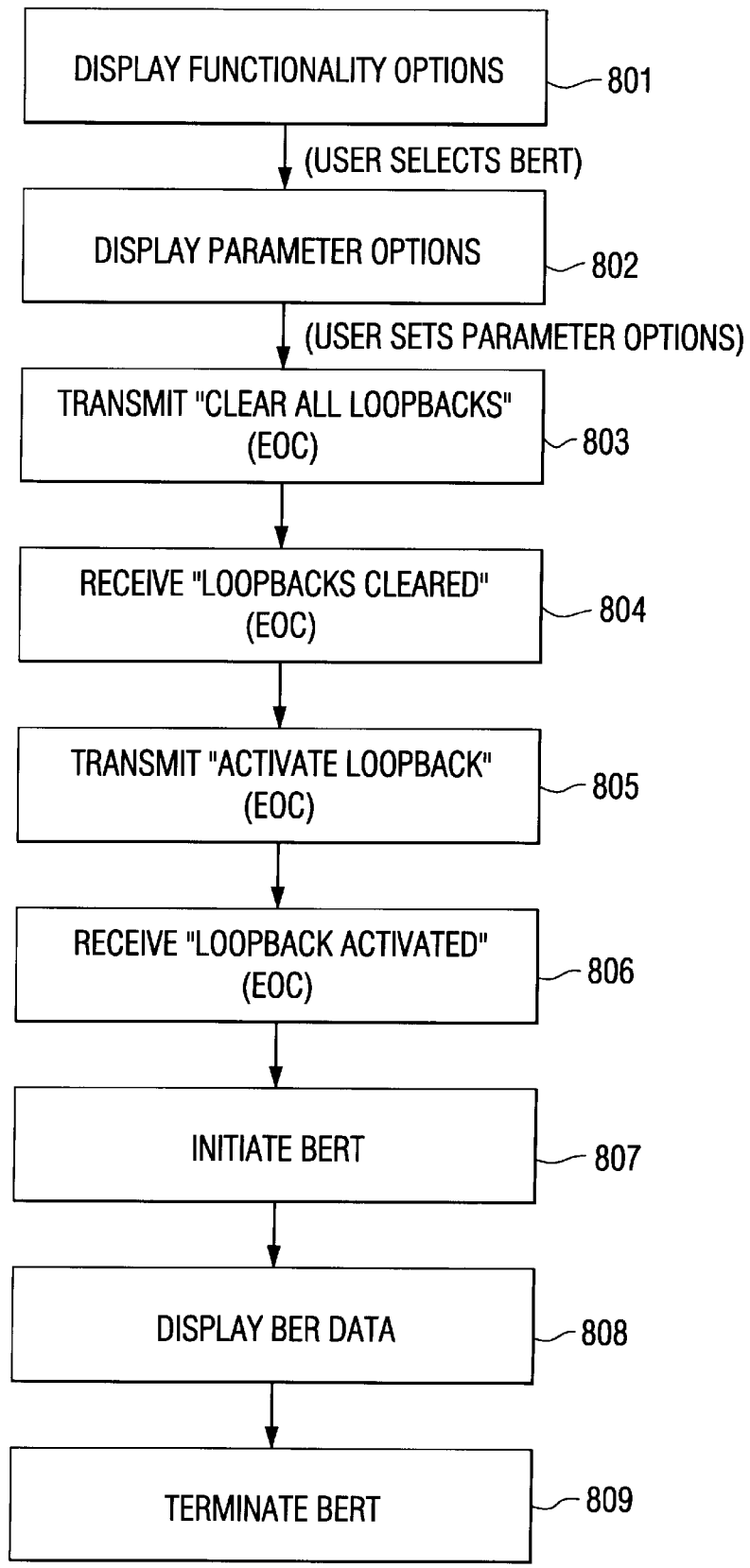
FIG. 8 is a flow chart of the operation of the test set connectivity diagram of FIG. 6 for conducting eoc communications for testing a (two-wire) U interface.

In accordance with the eoc-based message exchange sequence of the first aspect of the present invention, a user or craftsperson operating a sourcing test set (such as test set 410 connected as an LT device at the central office 402) activates a MENU key 312 on the test set keypad 300 (as shown pictorially in FIG. 7), causing the test set's LCD display panel 360 to display a list of options available to the user, one of which is BERT, shown at 362 in FIG. 7, and at step 801 in the flow chart of FIG. 8. The BERT option is selected by depressing a numeric key (e.g., '1') on the keypad 300 associated with the numerical listing ('1') in the displayed menu option: '1-BERT'.

In response to a key command selecting the BERT option, in step 802, the routine of FIG. 8 causes the display unit 360 to display a list of prescribed parameter options (that may include the data rate to be employed (e.g., 56 Kbaud or 64 Kbaud), the length of time the test is to be run, and which bearer channel (B1, B2 or both B1 and B2) is to be looped back for conducting the BERT). Using the keys of the test set keyboard 300, the user selects and provides parameter values for the listed menu options.

Once the list of parameter options has been entered, the user selects a START key that is displayed on the test unit's display screen 360, in response to which, in step 803, the routine causes the transmission of a first message: CLEAR ALL LOOPBACKS, over the embedded operations channel (eoc) to the far end device. This causes the far end device to clear all loopbacks (on each of the B1, B2 channels), and to transmit a return message (LOOPBACKS CLEARED), that indicates that all loopbacks have been cleared, which is received in step 804.

Next, in step 805, an ACTIVATE LOOPBACK message is transmitted. Within the ACTIVATE LOOPBACK message is an indication of which of the bearer channels is to be looped back (as previously menu-selected by the user in response to the parameter options displayed in step 802). In response to the ACTIVATE LOOPBACK message, the far end device loops back the channel or channels specified in the eoc message and returns a message (LOOPBACKS ACTIVATED), informing the test set that the loopback is complete, which is received in step 806. In response to receipt of this loopback activated message, in step 807, the routine initiates a BERT, by causing the transmission of a pseudo random bit stream (such as a continuously repeated 2048 random bit pattern) over the specified bearer channel. In step 808, whatever data is returned over the looped back bearer channel is compared with the contents of the transmitted pattern to derive a bit error ratio (BER) and the number of errors and the number of errored seconds, which are then displayed via the test set display 360 to the user. The BERT continues until either the user manually intervenes by selecting a stop key on the test set display, or the time-out loaded in step 802 expires, as shown at termination step 809.

To confirm proper operation of the BERT, the user may access an INSERT ERROR option of the displayed menu, to selectively cause the insertion of error bits in the pseudo random bit pattern being transmitted over the loop. Invoking this feature may be useful if the display continuously shows a BER of zero—indicating a pristine line. If this option is exercised, the displayed BERT data will necessarily reflect the injected errors.

Q CHANNEL TESTING OF S/T INTERFACE
FIG. 9

As described above with reference to FIGS. 6–8, testing of a two-wire U-interface installed between a line termination (LT) of a central office and a network termination (NT-1) at a customer premises may be conducted by coupling a test set 410 to a central office end of the two-wire circuit, and using the embedded operations channel (eoc) to exchange messages with a network termination (NT) unit 412 (such as another test set, or an NT-1 device) at the customer premises 404. If the far end device at the NT-1 site complies with the eoc command and loops back the channel or channels specified in the eoc message, a loopback confirmation message is displayed at the sourcing test set and a BERT is conducted, with the number of errors and errored seconds displayed via the test set display 360. As further described above, the test set of FIG. 1 may be coupled to the NT-1 end of the two-wire U-interface, so that it may respond to commands conveyed over the eoc from a device at the LT end of the two-wire link and display to a craftsperson at the NT-1 site whether the far end sourced commands have been received, thereby verifying the ability to use the link of interest.

In accordance with a second aspect of the invention, the test set of FIG. 1 may be used to test the four-wire S/T interface 430 installed between the network termination (NT-1) 412 and one or more terminal equipment devices 432 (or 433) at the customer premises 404 by coupling the test set of FIG. 1 to a terminal device end of the four-wire S/T circuit 430 and conducting a similar Q channel message exchange scenario that uses a channel other than or exclusive of the eoc channel, namely, the Q channel. In this mode, the test set's (test set 433) S/T interface 130 (FIG. 1) is used to gain access to the Q channel in order to exchange command-response messages (such as a Q channel loopback command) with the network termination (NT-1) unit 412 and provide an indication of whether the NT-1 has effected a loopback over the S/T interface 430 in compliance with the Q channel loopback command message.

Figure 9:
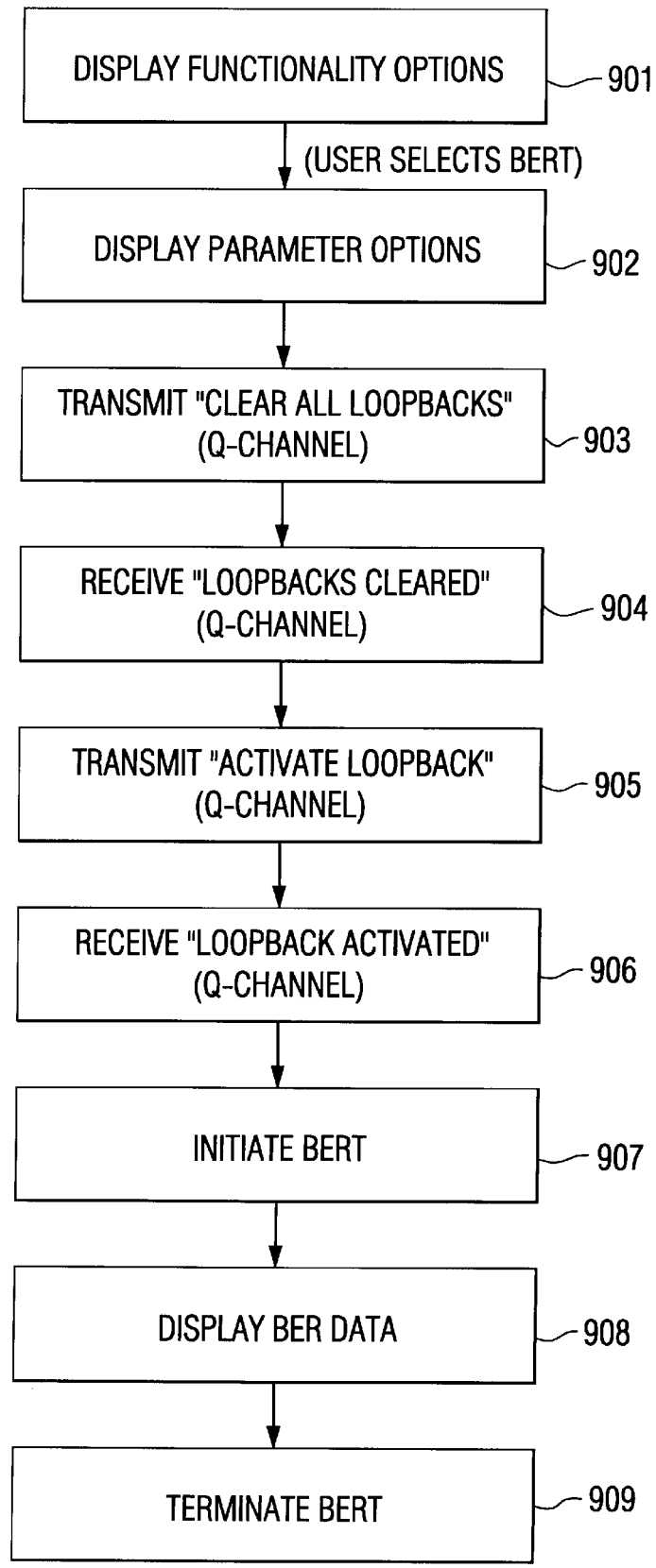
FIG. 9 is a flow chart of the operation of the test set connectivity diagram of FIG. 6 for conducting Q channel communications for testing a (four-wire) S/T interface.

As in the case of the eoc-based message exchange described above, a user or craftsperson operating a test set connected as a TE device 433 activates the MENU key 312 on the test set keypad 300 causing the test set's LCD display panel 360 to display a list of options available to the user (one of which is BERT), as shown at step 901 in the flow chart of FIG. 9. In response to a key command selecting the BERT option, in step 902, the S/T interface loopback test routine of FIG. 9 causes the display unit 360 to display a list of parameter options, such as the data rate to be employed, the length of time the test is to be run, and which bearer channel (B1, B2 or both B1 and B2, as described above. Via the keys of the test set keyboard 300, the user selects and provides parameter values for the listed menu options.

Once the list of parameter options has been entered, the craftsperson invokes the START key displayed on the test unit's display 360, in response to which, in step 903, the routine causes the transmission of a CLEAR ALL LOOPBACKS message over the Q channel to the NT-1 device. If the NT-1 device is operating properly it will transmit a return message (LOOPBACKS CLEARED), indicating that all loopbacks have been cleared, which is received in step 904.

Next, in step 905, an ACTIVATE LOOPBACK message, identifying which bearer channels are to be looped back (as previously menu-selected by the user). In response to the ACTIVATE LOOPBACK message, the NT-1 device loops back the channel or channels specified in the Q channel message and returns a message (LOOPBACKS ACTIVATED), informing the TE device-emulating test set 433 that the loopback is complete, which is received in step 906. In response to receipt of this loopback activated message, in step 907, the S/T interface test routine initiates a BERT, as described above for eoc channel messaging. In step 908, the measured bit error ratio (BER), the number of errors and the number of errored seconds are displayed.

The BERT continues until either the user manually intervenes by selecting a stop key on the test set display, or a time-out expires, as shown at termination step 909. As in the case of eoc testing of the two-wire interface 400, to confirm proper operation of the BERT on the Q channel portion of the looped back four-wire S/T interface, the craftsperson may access an INSERT ERROR option of the test set's displayed menu, to selectively cause the insertion of error bits in the transmitted pseudo random bit pattern.

As will be appreciated from the foregoing description, by using eoc and Q channel signaling, the auxiliary channel testing scheme of the present invention provides an enhancement of the ISDN communication and testing capability of the test set described in the '117 application, that facilitates line prequalification and post installation testing, and simplifies the interaction between the user/craftsperson and the test set, thereby minimizing line testing inaccuracies and improving performance. As pointed out above, using such auxiliary ISDN signaling channels, per se, to perform a BERT over ISDN bearer channels provides an immediate indication of whether the line under test is ISDN-qualified.

While we have shown and described a number of embodiments of auxiliary channel testing of an ISDN line in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of testing the operation of a communication link for transporting ISDN signals, comprising the steps of:
    (a) interfacing a first location of said communication link with an ISDN test set containing test circuitry that is controllably operative to test ISDN communication capability of said communication link;
    (b) interfacing a second location of said communication link with a device capable of conducting auxiliary ISDN channel signalling over an auxiliary ISDN channel that is exclusive of an embedded operations channel, and providing a loopback path over at least one ISDN bearer channel to said first location of said communication link;
    (c) causing said ISDN test set and said device to exchange digital communication messages over said auxiliary ISDN channel that are effective to cause said device to provide said loopback path over at said least one ISDN bearer channel to said ISDN test set at said first location and test a prescribed operational characteristic of said communication link.

2. A method according to claim 1, wherein said auxiliary ISDN channel comprises a Q channel of a four-wire, customer premises-associated communication link.

3. A method according to claim 1, wherein said communication link comprises a dry loop.

4. A method according to claim 1, wherein said communication link comprises an unpowered twisted metallic pair.

5. A method according to claim 1, wherein said communication link comprises a public telephone network.

6. A method according to claim 1, wherein step (c) comprises the steps of:
    (c1) in response to a user invoking an input/output element of said test set associated with a bit error test, conducting a command-response message exchange over said auxiliary ISDN channel, through which said device clears loopbacks, and then loops back one or more ISDN bearer channels, and
    (c2) in response to said far end device looping back said one or more bearer channels, conducting a bit error rate test over said looped back one or more bearer channels, and providing an indication of a result of said bit error rate test.

7. A method according to claim 6, wherein step (c1) comprises:
    (c1-1) in response to a user invoking an input/output element of said test set associated with a bit error test, providing a list of prescribed test parameter options for entry by the user,
    (c1-2) in response to said user entering said test parameter options, transmitting a first command message over said auxiliary ISDN channel instructing said device to clear loopbacks, and
    (c1-3) in response to said device clearing said loopbacks, transmitting a second command message over said auxiliary ISDN channel instructing said device to loop back said one or more ISDN bearer channels.

8. A method according to claim 7, wherein said list of prescribed test parameter options includes data rate, length of time the bit error rate test is to be run, and which bearer channel or channels are to be looped back.

9. A method according to claim 6, wherein step (c2) comprises intentionally injecting errors in said looped back one or more bearer channels, and providing an indication of a result of said bit error rate test that includes said intentionally injected errors.

10. A portable ISDN test set for testing the operation of a communication link for transporting ISDN signals, said portable ISDN test set comprising diverse types of digital communication interfaces for connection with multiple communication link configurations, and a supervisory control processor which controls the operation of said diverse types of digital communication interfaces for interfacing digital communication signals with said multiple communication link configurations, said supervisory control processor being operative to cause said portable ISDN test set, when coupled to a first location of said communication link by way of one of said diverse types of digital communication interfaces, to exchange with a device coupled to a second location of said communication link, digital communication messages, over an auxiliary ISDN channel exclusive of an embedded operations channel, that are effective to cause said device to provide a loopback path over at least one ISDN bearer channel to said craftsperson's portable ISDN test set at said first location and test a prescribed operational characteristic of said communication link.

11. An ISDN test set according to claim 10, wherein said auxiliary ISDN channel comprises a Q channel of a four-wire, customer premises-associated communication link.

12. An ISDN test set according to claim 10, wherein said communication link comprises one of a dry loop, an unpowered twisted metallic pair, and a public telephone network.

13. An ISDN test set according to claim 10, wherein said supervisory control processor is operative, in response to a user invoking an input/output element of said test set associated with a bit error test, to conduct a command-response message exchange over said auxiliary ISDN channel, through which said device clears loopbacks, and then loops back one or more ISDN bearer channels and, in response to said far end device looping back said one or more bearer channels, conducting a bit error rate test over said looped back one or more bearer channels, and providing an indication of a result of said bit error rate test.

14. An ISDN test set according to claim 13, wherein said supervisory control processor is operative, in response to a user invoking an input/output element of said test set associated with a bit error test, to provide a list of prescribed test parameter options for entry by the user and, in response to said user entering said test parameter options, to transmit a first command message over said auxiliary ISDN channel instructing said device to clear loopbacks and, in response to said device clearing said loopbacks, to transmit a second command message over said auxiliary ISDN channel instructing said device to loop back said one or more ISDN bearer channels.

15. An ISDN test set according to claim 14, wherein said list of prescribed test parameter options includes data rate, length of time the bit error rate test is to be run, and which bearer channel or channels are to be looped back.

16. An ISDN test set according to claim 13, wherein said test set is configured to enable said user to intentionally inject errors in said looped back one or more bearer channels, and to provide an indication of a result of said bit error rate test that includes said intentionally injected errors.

17. A method of testing the operation of a communication link for transporting ISDN signals, comprising the steps of:
(a) interfacing a first location of said communication link with an ISDN test set containing test circuitry that is controllably operative to test ISDN communication capability of said communication link;
(b) interfacing a second location of said communication link with a device capable of conducting auxiliary ISDN channel signalling with said ISDN test set over an auxiliary ISDN channel that is exclusive of an embedded operations channel; and
(c) causing said ISDN test set and said device to exchange digital communication messages over said auxiliary ISDN channel that are effective to test the ability of said communication link to support ISDN communications.

18. A method according to claim 17, wherein said auxiliary ISDN channel comprises a Q channel of a four-wire, customer premises-associated communication link.

* * * * *